United States Patent
Tetrick et al.

(10) Patent No.: US 12,474,848 B2
(45) Date of Patent: Nov. 18, 2025

(54) TECHNIQUES FOR MEMORY RESOURCE CONTROL USING MEMORY RESOURCE PARTITIONING AND MONITORING

(71) Applicant: Ampere Computing LLC, Santa Clara, CA (US)

(72) Inventors: Raymond Scott Tetrick, Portland, OR (US); Nagi Aboulenein, King City, OR (US); Massimo Sutera, Sunnyvale, CA (US); Shivnandan Kaushik, Portland, OR (US)

(73) Assignee: Ampere Computing LLC, Santa Clara, CA (US)

( * ) Notice: Subject to any disclaimer, the term of this patent is extended or adjusted under 35 U.S.C. 154(b) by 0 days.

(21) Appl. No.: 18/490,673

(22) Filed: Oct. 19, 2023

(65) Prior Publication Data
US 2025/0130729 A1    Apr. 24, 2025

(51) Int. Cl.
    G06F 3/06    (2006.01)
(52) U.S. Cl.
    CPC ............ *G06F 3/0634* (2013.01); *G06F 3/061* (2013.01); *G06F 3/0653* (2013.01); *G06F 3/0673* (2013.01)
(58) Field of Classification Search
    CPC ...... G06F 3/0634; G06F 3/061; G06F 3/0653; G06F 3/0673
    USPC ........................................................ 711/105
    See application file for complete search history.

(56) References Cited

U.S. PATENT DOCUMENTS

| | | | | |
|---|---|---|---|---|
| 7,159,096 | B2 * | 1/2007 | Khan | G06F 12/1027 711/202 |
| 7,218,644 | B1 * | 5/2007 | Heinonen | H04L 47/765 370/468 |
| 8,532,140 | B2 * | 9/2013 | Shimizu | H04W 74/0866 455/515 |
| 8,559,455 | B1 * | 10/2013 | Yuan | H04W 16/14 370/444 |
| 8,971,273 | B2 * | 3/2015 | Chan | H04W 72/541 370/329 |
| 9,949,261 | B2 * | 4/2018 | Chen | H04L 5/0094 |
| 10,871,910 | B1 * | 12/2020 | Alrod | G06F 12/0607 |
| 12,007,896 | B2 * | 6/2024 | Shannon | G06F 12/0842 |
| 2002/0163937 | A1 * | 11/2002 | Svacek | H04J 3/16 370/468 |

(Continued)

*Primary Examiner* — Reginald G Bragdon
*Assistant Examiner* — Aaron D Ho
(74) *Attorney, Agent, or Firm* — Muncy, Geissler, Olds & Lowe, P.C.

(57) ABSTRACT

Disclosed are techniques for memory resource control using Memory System Resource Partitioning and Monitoring (MPAM). In an aspect, a method of memory-system resource usage monitoring on a processing unit may include attaching a partition identifier from a set of partition identifiers to each memory access request of a plurality of memory access requests on an interconnect. The method may also include interleaving each memory access request of the plurality of memory access requests to a set of memory system components. The method may also include determining a first bandwidth associated with a first memory system component of the set of memory system components. The method may also include applying the first bandwidth associated with the first memory system component to one or more other memory system components of the set of memory system components based at least in part on the interleaving each memory access request.

20 Claims, 10 Drawing Sheets

(56) References Cited

U.S. PATENT DOCUMENTS

| | | | |
|---|---|---|---|
| 2004/0002339 A1* | 1/2004 | O'Connor | H04L 47/762 455/450 |
| 2004/0181594 A1* | 9/2004 | Suleiman | H04L 67/62 709/225 |
| 2004/0193777 A1* | 9/2004 | LaBerge | G11C 5/04 711/115 |
| 2007/0237125 A1* | 10/2007 | Ohuchi | H04W 16/04 370/338 |
| 2012/0179883 A1* | 7/2012 | Ma | G06F 13/1647 711/E12.001 |
| 2015/0071075 A1* | 3/2015 | Ramakrishnan | H04L 65/762 370/236 |
| 2015/0095594 A1* | 4/2015 | Suvakovic | H03M 13/27 711/157 |
| 2016/0275013 A1* | 9/2016 | Van Lunteren | G06F 12/0607 |
| 2016/0284040 A1* | 9/2016 | Rengarajan | G06F 3/06 |
| 2018/0262813 A1* | 9/2018 | Moorthy | H04N 21/2662 |
| 2019/0042408 A1* | 2/2019 | Schmisseur | G06F 9/505 |
| 2020/0177507 A1* | 6/2020 | Thanasekaran | G06F 3/0659 |
| 2020/0379930 A1* | 12/2020 | Brownell | G06F 13/4282 |
| 2021/0004163 A1* | 1/2021 | Xu | G06F 9/4881 |
| 2022/0222010 A1* | 7/2022 | Bachmutsky | G06F 3/0655 |
| 2022/0283719 A1* | 9/2022 | Eyerman | G06F 11/3409 |
| 2023/0289288 A1* | 9/2023 | Agarwal | G06F 12/0888 |
| 2023/0418765 A1* | 12/2023 | Tune | G06F 12/126 |
| 2024/0152448 A1* | 5/2024 | Wang | G06F 12/0811 |

* cited by examiner

| Completer 305 | Memory Channel Controller | | | | | | | | | ... | |
|---|---|---|---|---|---|---|---|---|---|---|---|
| | 00 | 01 | 02 | 03 | 04 | 05 | 06 | 07 | 08 | ... | 15 |
| Requester | Core 2 | Core 6 | Core 26 | Core 61 | Core 0 | Core 6 | Core 10 | Core 97 | Core 163 | | |
| Memory Request Identifier | 0 | 3 | 5 | 9 | 19 | 23 | 33 | 40 | 47 | | |
| MPAP Partition Identifier 310 | PARTID3 | PARTID6 | PARTID6 | PARTID6 | PARTID6 | PARTID6 | PARTID6 | PARTID6 | PARTID3 | | |
| Requester | Core 85 | Core 121 | Core 3 | Core 92 | Core 122 | Core 46 | Core 0 | Core 46 | | | |
| Memory Request Identifier | 1 | 7 | 12 | 16 | 22 | 30 | 35 | 42 | | | |
| MPAP Partition Identifier 310 | PARTID1 | PARTID2 | PARTID3 | PARTID5 | PARTID5 | PARTID2 | PARTID2 | PARTID3 | | | |
| Requester | Core 6 | Core 27 | Core 50 | Core 89 | Core 16 | Core 108 | Core 58 | Core 55 | | | |
| Memory Request Identifier | 2 | 8 | 14 | 17 | 25 | 32 | 39 | 44 | | | |
| MPAP Partition Identifier 310 | PARTID6 | PARTID3 | PARTID2 | PARTID3 | PARTID3 | PARTID0 | PARTID3 | PARTID0 | | | |

*FIG. 3B*

| Requester | Core 29 | Core 44 | Core 6 | Core 28 | Core 89 | Core 31 | Core 114 |
|---|---|---|---|---|---|---|---|
| Memory Request Identifier 310 | 4 | 11 | 15 | 24 | 29 | 38 | 41 |
| MPAP Partition Identifier | PARTID0 | PARTID5 | PARTID5 | PARTID2 | PARTID2 | PARTID3 | PARTID0 |

| Requester | Core 109 | Core 181 | Core 61 | Core 0 | Core 76 | Core 28 | |
|---|---|---|---|---|---|---|---|
| Memory Request Identifier 310 | 6 | 18 | 21 | 28 | 31 | 45 | |
| MPAP Partition Identifier | PARTID2 | PARTID4 | PARTID0 | PARTID0 | PARTID0 | PARTID5 | |

| Requester | Core 98 | Core 77 | Core 76 | Core 113 | Core 51 | | |
|---|---|---|---|---|---|---|---|
| Memory Request Identifier 310 | 10 | 20 | 27 | 34 | 36 | | |
| MPAP Partition Identifier | PARTID5 | PARTID4 | PARTID4 | PARTID4 | PARTID4 | | |

| Requester | Core 16 | Core 5 | Core 19 | Core 94 | Core 54 | | |
|---|---|---|---|---|---|---|---|
| Memory Request Identifier 310 | 13 | 26 | 37 | 43 | 46 | | |
| MPAP Partition Identifier | PARTID4 | PARTID1 | PARTID1 | PARTID1 | PARTID1 | | |

*FIG. 3B (CONT.)*

| Completer | I/O Completer via CXL Memory Interface | | | | | | | |
|---|---|---|---|---|---|---|---|---|
| | 00 | | 01 | | 02 | | 03 | |
| Requester | SMMU from I/O Device Requestor | | | | | | | |
| | I/O Dev 4 | I/O Dev 0 | I/O Dev 2 | I/O Dev 5 | I/O Dev 1 | I/O Dev 1 | I/O Dev 3 | I/O Dev 7 |
| Memory Request Identifier | 0 | 1 | 2 | 3 | 4 | 5 | 6 | 7 |
| MPAP Partition Identifier | PARTID2 | PARTID3 | PARTID1 | PARTID4 | PARTID0 | PARTID2 | PARTID2 | PARTID0 |

| Completer | I/O Completer via CXL Memory Interface | | | | | | | |
|---|---|---|---|---|---|---|---|---|
| | 00 | | 01 | | 02 | | 03 | |
| Requester | SMMU from I/O Device Requestor | | | | | | | |
| | I/O Dev 2 | I/O Dev 7 | I/O Dev 3 | I/O Dev 6 | I/O Dev 5 | I/O Dev 0 | I/O Dev 4 | I/O Dev 2 |
| Memory Request Identifier | 8 | 9 | 10 | 11 | 12 | 13 | 14 | 15 |
| MPAP Partition Identifier | PARTID5 | PARTID1 | PARTID5 | PARTID4 | PARTID1 | PARTID6 | PARTID2 | PARTID5 |

*FIG. 7*

TECHNIQUES FOR MEMORY RESOURCE CONTROL USING MEMORY RESOURCE PARTITIONING AND MONITORING

BACKGROUND OF THE DISCLOSURE

1. Field of the Disclosure

Aspects of the disclosure relate generally to processes associated with cache and memory structures.

2. Description of the Related Art

Shared-memory computer systems may run multiple applications or multiple virtual machines (VMs) concurrently. The Memory System Resource Partitioning and Monitoring (MPAM) Extension Architecture Specification may provide software control for memory-system resource partitioning and/or memory-system resource usage monitoring. These two approaches of the MPAM Extension may apportion the performance-giving resources of the memory system. In some shared-memory computer systems, the apportionment of the performance-giving resources can be used to align the division of memory-system performance between different software applications, to match higher-level goals for dividing the performance of the system between software environments.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of memory-system resource usage monitoring on a processing unit includes attaching a partition identifier from a set of partition identifiers to each memory access request of a plurality of memory access requests on an interconnect. The method may also include interleaving each memory access request of the plurality of memory access requests to a set of memory system components. The method may also include determining a first bandwidth associated with a first memory system component of the set of memory system components. Additionally, the method may include applying the first bandwidth associated with the first memory system component to one or more other memory system components of the set of memory system components based at least in part on the interleaving each memory access request.

In an aspect, a processing unit includes an interconnect and one or more processors. The one or more processors may be communicatively coupled to the interconnect and may communicate with one or more memories. The one or more processors, either alone or in combination, may be configured to attach a partition identifier from a set of partition identifiers to each memory access request of a plurality of memory access requests on an interconnect: interleave each memory access request of the plurality of memory access requests to a set of memory system components: determine a first bandwidth associated with a first memory system component of the set of memory system components; and apply the first bandwidth associated with the first memory system component to one or more other memory system components of the set of memory system components based at least in part on the interleaving each memory access request.

In an aspect, a non-transitory computer-readable medium stores computer-executable instructions that, when executed by a processing unit, may cause the processing unit to: attach a partition identifier from a set of partition identifiers to each memory access request of a plurality of memory access requests on an interconnect: interleave each memory access request of the plurality of memory access requests to a set of memory system components: determine a first bandwidth associated with a first memory system component of the set of memory system components; and apply the first bandwidth associated with the first memory system component to one or more other memory system components of the set of memory system components based at least in part on the interleaving each memory access request.

In an aspect, a processing unit may include means for attaching a partition identifier from a set of partition identifiers to each memory access request of a plurality of memory access requests on an interconnect: means for interleaving each memory access request of the plurality of memory access requests to a set of memory system components: means for determining a first bandwidth associated with a first memory system component of the set of memory system components; and means for applying the first bandwidth associated with the first memory system component to one or more other memory system components of the set of memory system components based at least in part on the interleaving each memory access request.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 3B illustrates a second example of interleaving memory access requests to memory channel controllers, according to aspects of the disclosure.

FIG. 7 illustrates an example of interleaving memory access requests to a compute express link (CXL) memory interface, according to aspects of the disclosure.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Various aspects of the subject technology relate to techniques for memory resource control using Memory System Resource Partitioning and Monitoring (MPAM) extension features and the like. Generally, the memory resources of a microarchitecture may benefit from some partitioning and monitoring of their use. When using the MPAM extension features with high processing core counts in a microarchitecture, certain implementation considerations arise. For example, it may be advantageous to have a partition identifier (e.g., an MPAM PARTID) associated with each processing core of a processing unit. Additionally, some MPAM extension feature implementations may require that each memory channel controller support all MPAM ranges simultaneously. However, design constraints associated with the physical arrangement and components of the processing unit may arise when the number of processing cores increases.

In accordance with some aspects, a processing unit may be configured to interleave each memory access request of a plurality of memory access requests to a set of memory system components. Advantageously, the interleaving of the memory requests as described herein can enable system on chip (SoC) microarchitecture designs to implement fewer resources, for example, to support bandwidth monitoring. In some examples, the memory system components may correspond to memory channel controllers for accessing memory, such as a double data rate (DDR) synchronous dynamic random-access memory (SDRAM). Additionally, or alternatively, the resources associated with other memory system components, such as cache memory controllers, interconnect controllers, memory management units, etc. may be partitioned and/or monitored in accordance with some aspects.

Figure 1:
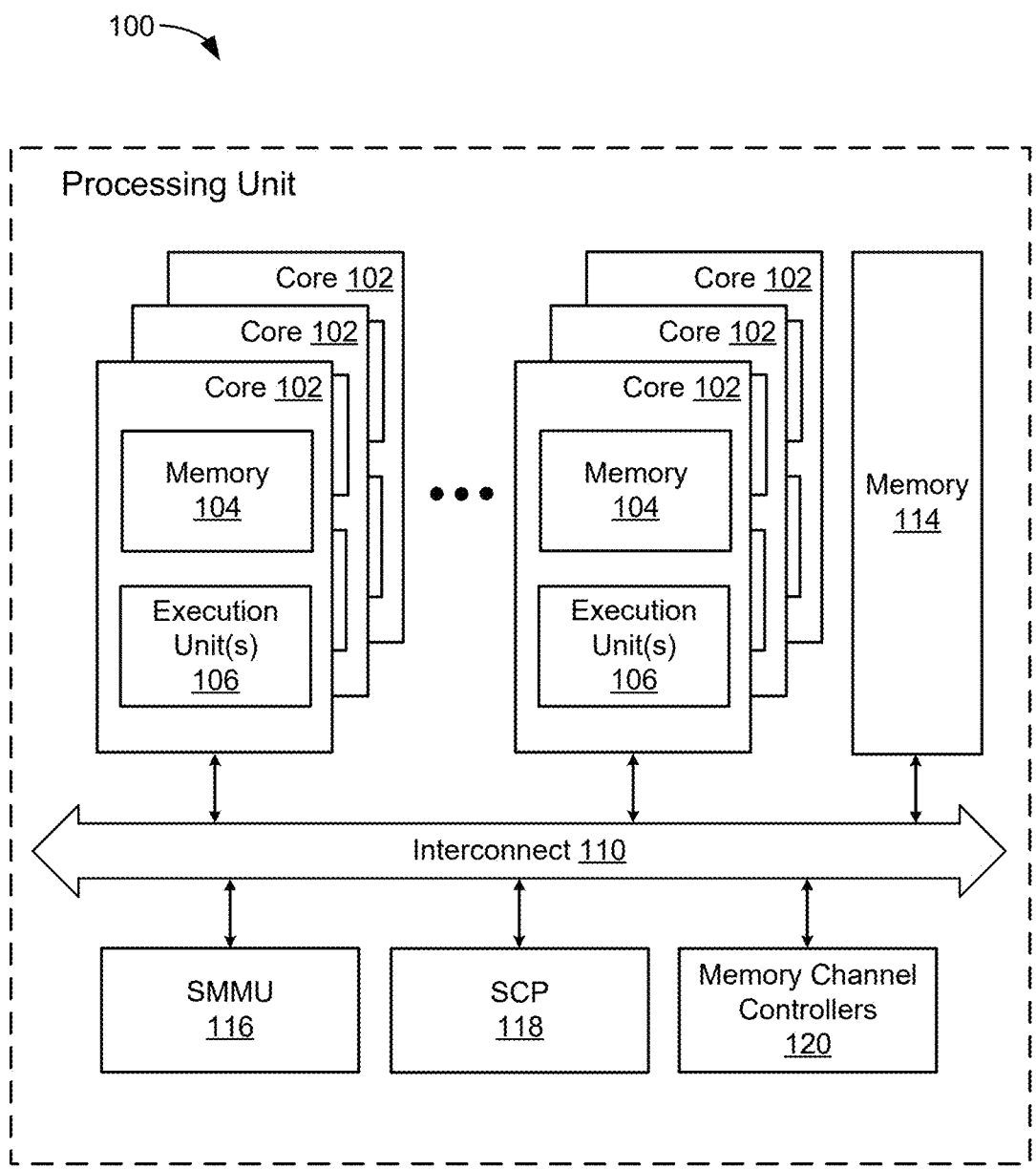
FIG. 1 illustrates a first example of a processing unit, according to aspects of the disclosure.

FIG. 1 illustrates a first example of a processing unit 100, according to aspects of the disclosure. In some examples, the techniques for memory resource control using MPAM described herein may be implemented using processing unit 100. Processing unit 100 is configured as a central processing unit (CPU) but may also be used with or configured as other processing units, such as but not limited to a graphics processing (GPU) or tensor processing unit (TPU). Processing unit 100 may include a set of processing cores 102 (or simply "cores" 102). Each core 102 may include memory 104 and one or more execution units 106. Each core 102 may be coupled to interconnect 110. In some examples, memory 104 may be configured as cache on the core 102 (e.g., 16 KB or 64 KB L1 Instruction-cache, 64 KB L1 Data-cache, and 1 MB or 2 MB L2 cache, in some aspects).

The one or more execution units 106 may perform various operations and calculations associated with instructions and micro-operations of the core 102. The one or more execution units 106 may be configured as various units in the core 102 in accordance with various implementations. For example, the one or more execution units 106 may include arithmetic logic units (ALUs) that perform arithmetic and logic operations for the core 102. The one or more execution units 106 may include floating point units (FPUs) that perform floating point calculations. The one or more execution units 106 may include integer execution units (IXUs) for performing integer operations. The one or more execution units 106 may also include single instruction, multiple data (SIMD) execution units for performing various instructions. In some examples, an execution unit 106 may perform a combination of these and other operations. Each of the one or more execution units 106 may include a bus or interconnect, for example, to connect hardware elements of the execution units 106 to memory 104 to perform read and write functions while executing micro-operations. Additionally, or alternatively, one or more execution units 106 including ALUs, FPUs, IXUs, and/or SIMD execution units may be configured for all or a subset of the cores 102.

Processing unit 100 may also include memory 114, which may be coupled to interconnect 110. In some examples, memory 114 may include system-level cache (e.g., 32 MB or 64 MB, in some aspects) that may be used for various purposes by the processing unit 100. Processing unit 100 may also include a system memory management unit (SMMU) 116, The SMMU 116 may provide translation services, for example, to non-processor master units. That is, for example, the SMMU 116 may translate addresses for direct memory address (DMA) requests from system input/output (I/O) devices before the requests are passed to interconnect 110. Processing unit 100 may also include a system control processor (SCP) 118. The SCP 118 may be configured to handle various system management functions. In some examples, the SCP 118 may include separate microcontrollers (or processors). In some examples, the SCP 118 may be combined into one or two microcontrollers, or sub-divided into more than two microcontrollers in accordance with various implementations to handle various system management functions.

Interconnect 110 may be configured as a mesh interconnect that forms a high-speed interface that couples each of core 102 to the other cores 102 and other components in processing unit 100. Processing unit 100 may also include memory channel controllers 120 that may be operatively coupled to various memory devices (e.g., external to the processing unit 100).

It is to be appreciated that the processing unit 100 of FIG. 1 may be configured according to a monolithic die design or a disaggregated chiplet design. That is, for example, in the monolithic die design, the cores 102, interconnect 110, memory 114, SMMU 116, and SCP 118 may be configured on a single die. In some cases, for example, in the disaggregated chiplet design, each chiplet of multiple disaggregated chiplets may include a subset of the cores 102 (e.g., in a tiled fashion) with a memory controller to control a portion of memory 114, and a peripheral component interconnect (PCI) or PCI express (PCIe) controller to control the interface with interconnect 110, SMMU 116, and/or SCP 118. Additionally, or alternatively, other computer architecture designs may be used in various implementations give the benefit of the disclosure.

Figure 2:
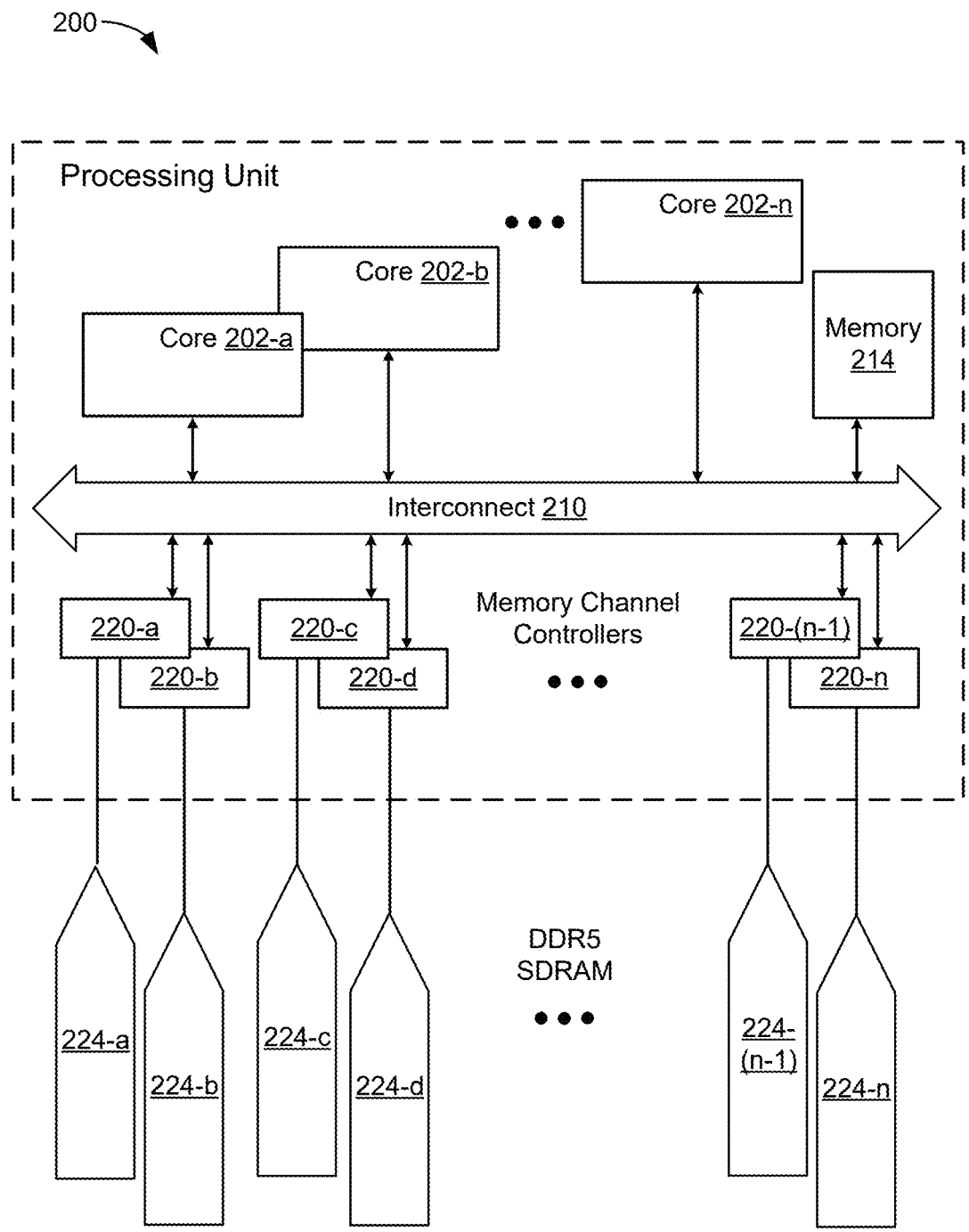
FIG. 2 illustrates a second example of a processing unit, according to aspects of the disclosure.

FIG. 2 illustrates a second example of a processing unit 200, according to aspects of the disclosure. In some examples, the techniques for memory resource control using MPAM described herein may be implemented using processing unit 200. Various aspects associated with processing unit 100 may be included in processing unit 200. Similar to processing unit 100, processing unit 200 may be configured as a CPU, a GPU, a TPU, or other processing units. Processing unit 200 may include a set of cores 202. The set of cores 202 in processing unit 200 may include 'n' number of cores 102 in accordance with various implementations (e.g., a first core 202-a, a second core 202-b, . . . , an $n^{th}$ core 202-n). Processing unit 200 may be configured with 136 cores, 144 cores, 160 cores, 176 cores, or 192 cores, in accordance with some implementations. Each core 202 may perform various memory access operations related to cache memory and memory storage functions.

In some examples, each core 202 is coupled to interconnect 210, which may be an SoC coherent interconnect. Processing unit 200 may also include memory 214, which may be coupled to interconnect 210. In some examples, memory 214 may include system-level cache or last-level cache. In some examples, the memory 214 may be divided into portions to support a cluster of cores 202 as well as other components of processing unit 200. As illustrated in the example of FIG. 2, the processing unit 200 may include memory controllers and memory devices, such as memory channel controllers 220-a to 220-n and DDR5 SDRAMs 224-a to 224-n (e.g., 8 TB total memory in some aspects).

In some examples, the memory channel controllers 220-a to 220-n may be configured in a sub-channel configuration with the DDR5 SDRAM 224. That is, for example, a first memory channel may include a first memory channel controller 220-a and a second memory channel controller 220-b operatively coupled to a first DDR5 SDRAM 224-a and a second DDR5 SDRAM 224-b, respectively. A second memory channel may include a third memory channel controller 220-c and a fourth memory channel controller 220-d operatively coupled to a third DDR5 SDRAM 224-c and a fourth DDR5 SDRAM 224-d, respectively. Processing unit 200 may include 'n'/2 number of memory channels, for example, an 'n'/$2^{th}$ memory channel including an (n−1) memory channel controller 220-(n−1) and an $n^{th}$ memory channel controller 220-n operatively coupled to an (n−1) DDR5 SDRAM 224-(n−1) and an $n^{th}$ DDR5 SDRAM 224-n, respectively.

For example, processing unit 200 may include eight memory channels having 16 memory channel controllers 220-a to 220-n and 16 DDR5 SDRAMs 224-a to 224-n, each of which may be configured for memory resource control using MPAM. However, it is to be understood that different number of channels and other types of memory may be utilized in accordance with various implementations. In some aspects, processing unit 200 may perform memory-system resource usage monitoring. For example, a processing element, such the cores 202 may attach or tag an MPAM PARTID to each memory access request that is sent to interconnect 210. The MPAM PARTID attached to each memory access request may be from a set of MPAM PARTIDs. In some examples, the set of MPAM PARTIDs may include PARTID0, PARTID1, PARTID2, PARTID3, PARTID4, PARTID5, and PARTID6 for a total of seven partition identifiers. That is, for example, each memory request from one of the cores 202 that is sent to interconnect 210 for completion may include an MPAM PARTID and other MPAM information for controlling one or more memory resources associated with the corresponding memory request.

The set of MPAM PARTIDs may include PARTIDs that define or partition the memory resources available to a particular memory access request. In some cases, the partitioning or limiting of the memory resources indicated by a particular PARTID may include the shared system-level cache of memory 214. That is, for example, PARTID0 may indicate a first percentage of the shared system-level cache that may be accessed, PARTID1 may indicate a second percentage of the shared system-level cache that may be accessed, etc.

Additionally, or alternatively, the partitioning or limiting of the memory resources indicated by a particular PARTID may include a bandwidth range for an interconnect 210. That is, for example, PARTID0 may indicate a first bandwidth range (e.g., a first minimum bandwidth and a first maximum bandwidth) that may be used when accessing the interconnect 210, PARTID1 may indicate a second bandwidth range (e.g., a second minimum bandwidth and a second maximum bandwidth) that may be used when accessing the interconnect 210, etc.

Additionally, or alternatively, the partitioning or limiting of the memory resources indicated by a particular PARTID may include a bandwidth range for a memory channel controller 220. That is, for example, PARTID0 may indicate a first bandwidth range (e.g., a first minimum bandwidth and a first maximum bandwidth) that may be used when accessing a memory channel controller 220, PARTID1 may indicate a second bandwidth range (e.g., a second minimum bandwidth and a second maximum bandwidth) that may be used when accessing a memory channel controller 220, etc.

In some examples, the processing unit 200 may interleave each memory access request from the cores 202 to the memory channel controllers 220-a to 220-n. Various interleaving techniques may be used in accordance with various implementations as described herein. For example, the interleaving of each memory access request from the cores 202 to the memory channel controllers 220-a to 220-n may be performed in accordance with the interleaving patterns illustrated with respect to the examples of FIGS. 3A and 3B.

Figure 3A:
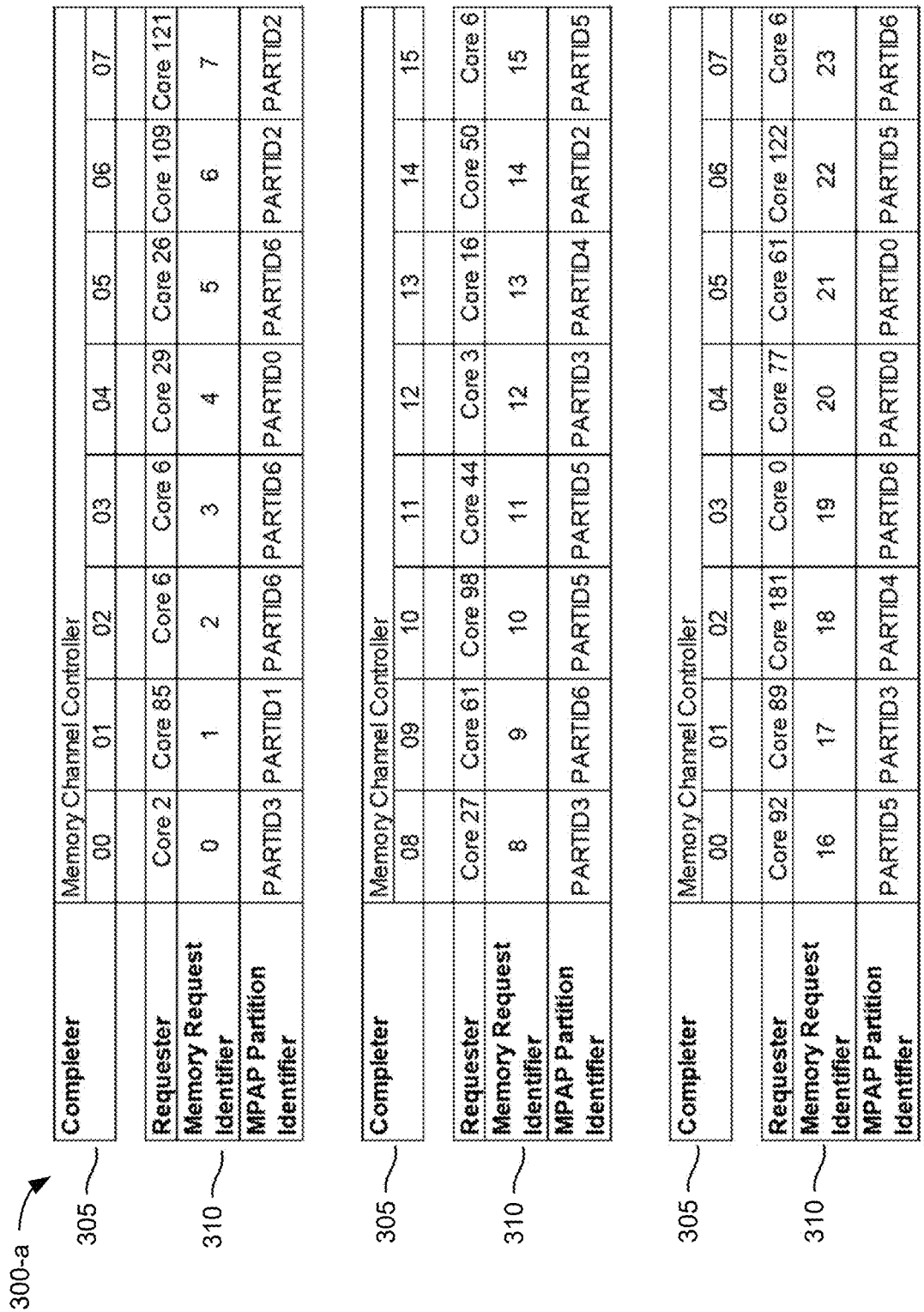
FIG. 3A illustrates a first example of interleaving memory access requests to memory channel controllers, according to aspects of the disclosure.

FIG. 3A illustrates a first interleaving example 300-a of interleaving memory access requests to memory channel controllers, according to aspects of the disclosure. The interleaving example 300-a and interleaving techniques and patterns thereof may be applied to processing unit 100, processing unit 200, or any processing units described herein. The interleaving example 300-a depicts an interleaving technique in which each memory access request is interleaved sequentially to the memory channel controllers.

The MPAM completer rows 305 of interleaving example 300-a list 16 memory channel controllers designated as memory channel controller 00 to memory channel controller 15 (e.g., memory channel controllers 220-a to 220-n). The MPAM requestor rows 310 of interleaving example 300-a identify a memory access request from one of 192 cores (e.g., cores 202), a sequential identifier corresponding to the memory access request, and an MPAM PARTID for the memory access request.

As illustrated in the interleaving example 300-a of FIG. 3A, each memory access request is sequentially provided to a next memory channel controller for completion of the request irrespective of the core from which the request came or the MPAM PARTID for the memory access request. For example, after the last memory channel controller (e.g., memory channel controller 15) in the set of memory channel controllers is provided with a memory access request (e.g., memory request identifier 15 from core 6 with an MPAM PARTID5), the first memory channel controller (e.g., memory channel controller 00) in the set of memory channel controllers is provided with the next memory access request (e.g., memory request identifier 16 from core 92 with an MPAM PARTID5).

FIG. 3B illustrates a second interleaving example 300-b of interleaving memory access requests to memory channel controllers, according to aspects of the disclosure. The interleaving example 300-b and interleaving techniques and patterns thereof may be applied to processing unit 100, processing unit 200, or any processing units described herein. The interleaving example 300-b depicts an interleaving technique in which each memory access request that corresponds to a particular MPAM PARTID is interleaved sequentially to the memory channel controllers.

The MPAM completer rows 305 of interleaving example 300-b list 16 memory channel controllers designated as memory channel controller 00 to memory channel controller 15 (e.g., memory channel controllers 220-a to 220-n). The MPAM requestor rows 310 of interleaving example 300-b identify a memory access request from one of 192 cores (e.g., cores 202), a sequential identifier corresponding to the memory access request, and an MPAM PARTID for the memory access request. In interleaving example 300-b, each column represents the memory access request assigned for completion by a particular memory channel controller. For reference, a first MPAM completer column 315 represents the memory access requests completed by memory channel controller 00 and a last MPAM completer column 320 represents the memory access requests completed by memory channel controller 15.

In interleaving example 300-b, memory access requests are assigned sequentially to a particular memory channel controller in accordance with the sequential identifier corresponding to the memory access request until a next memory access request includes an MPAM PARTID already assigned to that particular memory channel controller. The next instance for which a memory access request with the MPAM PARTID already assigned to that particular memory channel controller is to be assigned, is interleaved for completion to the next memory channel controller of the memory access controllers. In this manner, each memory channel controller may be load balanced such that an approximately equal number (and type according to the MPAM PARTID) of memory access requests are distributed to each memory channel controller in the set of memory channel controllers.

For example, due to the memory access requests in interleaving example 300-b using each of the MPAM PARTIDs (e.g., PARTID0, PARTID1, PARTID2, PARTID3, PARTID4, PARTID5, and PARTID6) with some regularity for the memory access requests from the various cores, the first MPAM completer column 315 representing the memory access requests completed by memory channel controller 00 include seven memory access requests corresponding to one memory access request for each of the seven PARTIDs. In interleaving example 300-b, the subsequent MPAM completer columns representing the memory access requests completed by memory channel controller 01, memory channel controller 02, memory channel controller 03, and memory channel controller 04, each similarly include seven memory access requests corresponding to one memory access request for each of the seven MPAM PARTIDs.

Additionally, a location of the most utilized MPAM PARTID (i.e., PARTID3) in the sample set of memory access requests is accentuated (in bold text) showing where instances of PARTID3 occur according to the interleaving technique of interleaving example 300-b. As shown, the last MPAM completer column 320 representing the memory access requests completed by memory channel controller 15 does not yet include any memory access requests due to the memory access requests in interleaving example 300-b using each of the MPAM PARTIDs with some regularity in this sample set. However, as can be deduced from interleaving example 300-b and understood given the benefit of the disclosure, if the first 32 sequential memory access requests (e.g., request identifier 0) for core 2 through request identifier 31 for core 76) each had the same MPAM PARTID (e.g., PARTID3 as used in request identifier 0), these 32 memory access requests would be interleaved through each of the memory channel controllers (e.g., memory channel controller 01 through memory channel controller 15) twice.

In each of interleaving example 300-a and interleaving example 300-b, the utilization of the multiple memory controllers and corresponding memory devices (e.g., DDR5 SDRAMs 224-a to 224-n) may be sufficiently uniform based on the memory access patterns applied by the interleaving techniques. Moreover, it is to be understood that other interleaving, striping, and/or memory access patterns to generate sufficiently uniform access across a set of memory system components are contemplated as would be apparent given the benefit of the disclosure.

Referring back to FIG. 2, processing unit 200 may determine a first bandwidth associated with the first memory channel controller 220-a. In some cases, the first bandwidth may correspond to a workload performance of first memory channel controller 220-a and may be measured according to various techniques (e.g., based on clock cycles and a bandwidth of the interconnect 210, cache misses, memory access request evictions, various errors, etc.). That is, for example, memory system resources available to a software environment associated with processing unit 200 may vary depending on the memory access granted to the various applications in the software environment. If one of the applications in the software environment begins to consume more memory system resource bandwidth than expected, that application can interfere with the use by other applications, for example, due to contention bus bandwidth of the DDR5 SDRAMs 224-a to 224-n controlled by the memory channel controllers 220-a to 220-n.

In some examples, the processing unit 200 may apply the first bandwidth associated with the first memory channel controller 220-a to one or more other memory channel controllers 220-a to 220-n. That is, for example, based at least in part on the interleaving techniques used for each memory access request from the cores 202 causing substantial uniformity across the memory channel controllers 220-a to 220-n, the processing unit 200 may reasonably determine that the first bandwidth measured for the first memory channel controller 220-a may be extrapolated as the bandwidth for the second memory channel controller 220-b, the third memory channel controller 220-c, the fourth memory channel controller 220-d, etc.

Advantageously, the monitoring resources associated with the memory channel controllers 220-a to 220-n may be implemented as additive features rather than redundant in which each of the memory channel controllers 220-a to 220-n is separately monitored. In some cases, a high number of simultaneous memory resource partitions may be provided at minimal hardware cost to the processing unit 200. For example, if the processing unit 200 is configured with eight memory channels having 16 memory channel controllers 220-a to 220-n (e.g., two subchannels for each memory channel) and seven MPAM PARTIDs, then the processing unit 200 is effectively configured with 112 memory resource partitions that may be monitored from a single memory channel controller 220 (e.g., the first memory channel controller 220-a).

In some case, for example, if the processing unit 200 is configured with 12 memory channels having 24 memory channel controllers 220-a to 220-n (e.g., two subchannels for each memory channel) and seven MPAM PARTIDs, then the processing unit 200 is effectively configured with 168 memory resource partitions that may be monitored from a single memory channel controller 220 (e.g., the first memory channel controller 220-*a*). These 112 or 168 memory resource partitions may support a relatively high number of cores 202 on the processing unit 200, such as 136 cores, 144 cores, 160 cores, 176 cores, or 192 cores, in accordance with some implementations.

In some examples, when monitoring memory resource usage associated with first memory channel controller 220-*a*, it may be beneficial to adjust the memory resource control associated with the cores 202 of the processing unit 200. That is, for example, the processing unit 200 may monitor for changes in a bandwidth associated with the memory channel controller 220-*a*. The processing unit 200 may adjust a total memory bandwidth for all of the memory channel controllers 220-*a* to 220-*n* based at least in part on this monitoring of first memory channel controller 220-*a*.

For example, one of the MPAM PARTIDs that allows a wider bandwidth range to be used for accessing the memory channel controllers 220-*a* to 220-*n* may be temporarily suspended for use by all cores 202. Additionally, or alternatively, if an application in a software environment, such as a cloud computing environment associated with processing unit 200 is determined to be misusing or consume more memory system resource bandwidth than expected with respect to the first memory channel controller 220-*a* being monitored, the processing unit 200 may apply a more restrictive PARTID to the memory access requests from cores 202 executing that application. Thus, by monitoring a single memory channel controller 220 and interleaving memory access requests as described herein, the performance of all memory channel controllers 220-*a* to 220-*n* on the processing unit 200 may be effectively monitored and corrective actions (if necessary) for bandwidth balancing and/or security protection may be expediently applied to all memory channel controllers 220-*a* to 220-*n*.

Figure 4:
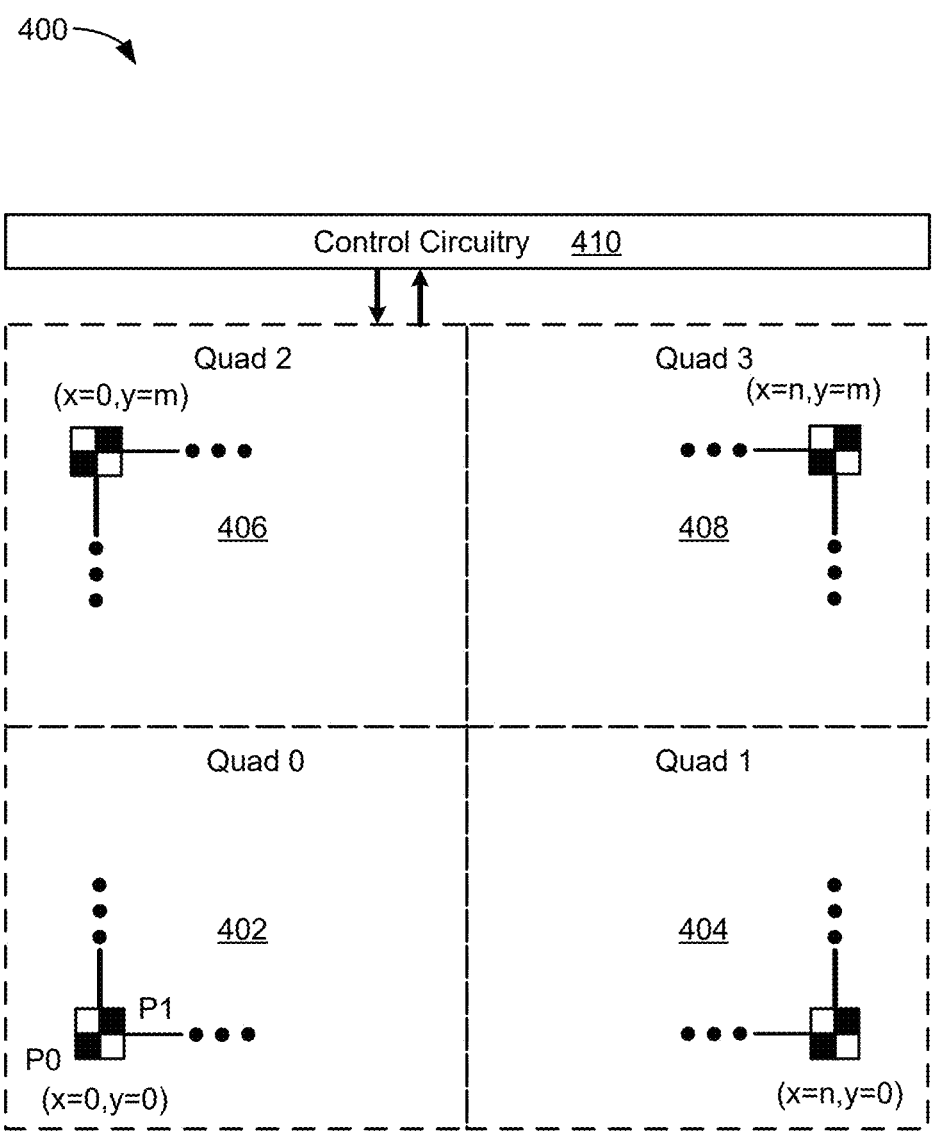
FIG. 4 illustrates an example of a processing unit using sub-NUMA (non-uniform memory access) domains or modes, according to aspects of the disclosure.

FIG. 4 illustrates an example of a processing unit 400 using sub-NUMA (non-uniform memory access) domains or modes, according to aspects of the disclosure. In some examples, the techniques for memory resource control using MPAM described herein may be implemented using processing unit 400. Various aspects associated with processing unit 100 and processing unit 200 may be included in processing unit 400. Similar to processing unit 100 and processing unit 200, processing unit 400 may be configured as a CPU, a GPU, a TPU, or other processing units. Processing unit 400 may include control circuitry 410 and a set of quadrants, such as Quadrant 0 402, Quadrant 1 404, Quadrant 2 406, and Quadrant 3 408.

The set of quadrants may represent sub-NUMA domains or modes for the processing unit 400. The partitionable cross-point elements of the processing unit 400 may be aligned and/or addressed in columns (e.g., x, where x=0 is the first column and x=n is the last column) and rows (e.g., y, where y=0) is the first row and y=m is the last row). Each cross-point element may be connected to a network of mesh interconnects and may have two device ports (P0 and P1) as further illustrated and described with respect to FIG. 5.

The control circuitry 410 may be configured to operatively control the set of quadrants. For example, the control circuitry 410 may include a generic interrupt controller (GIC) for communication between various ports. The control circuitry 410 may also include one or more RN-I (input/output (I/O) coherent requesting node) bridges, one or more HN-T (I/O home node with a debug trace controller) nodes, and at least one HN-D (I/O home node with a debug trace controller, distributed virtual memory (DVM) node, and configuration slave) node.

Figure 5:
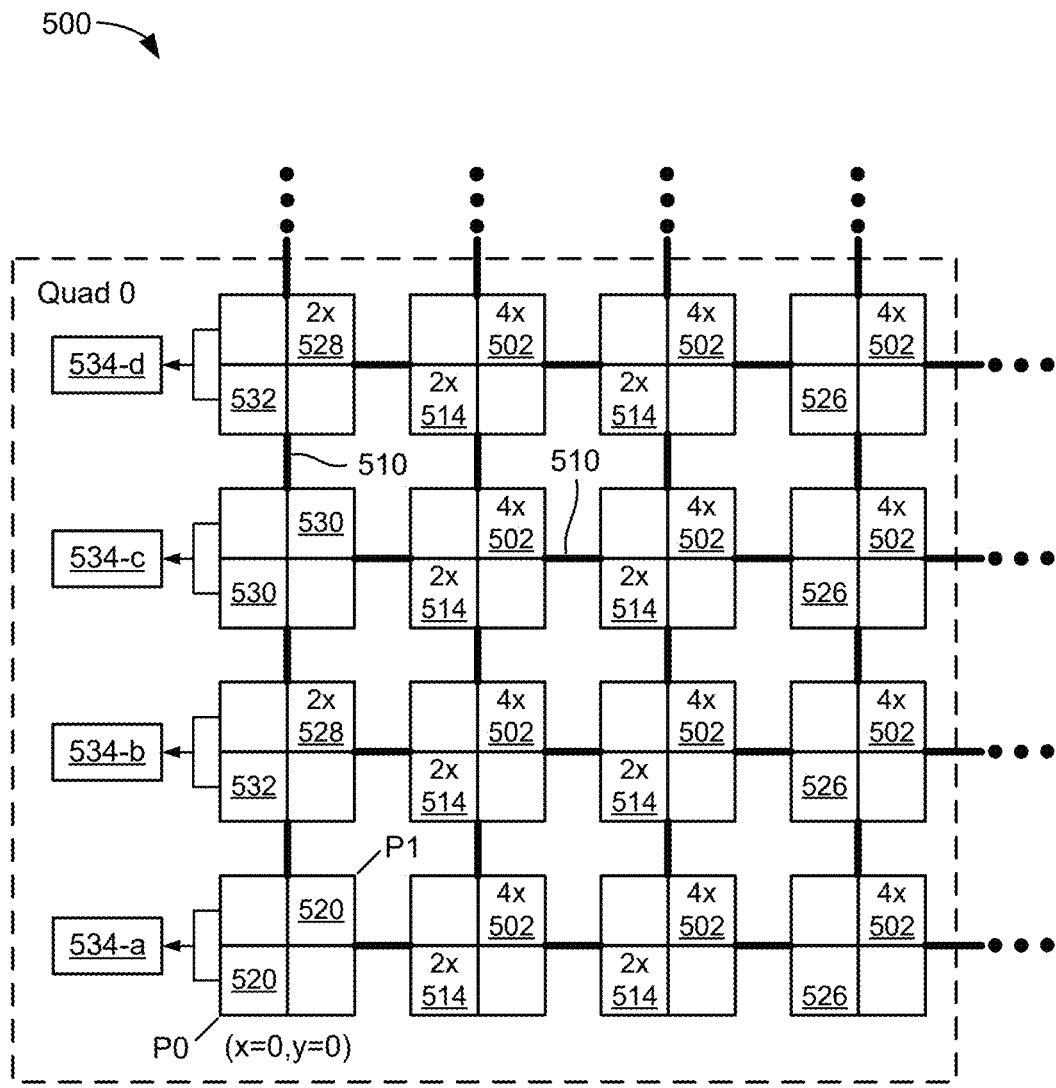
FIG. 5 illustrates an example quadrant of a processing unit using sub-NUMA domains or modes, according to aspects of the disclosure.

FIG. 5 illustrates an example quadrant 500 of a processing unit using sub-NUMA domains or modes, according to aspects of the disclosure. In some examples, the techniques for memory resource control using MPAM described herein may be implemented using quadrant 500 of a processing unit. Various aspects associated with processing unit 100, processing unit 200, and processing unit 400 may be included in quadrant 500.

For example, quadrant 500 may correspond to Quadrant 0 402 of processing unit 400, in accordance with some aspects. A network of mesh interconnects 510 may connect each of the cross-point elements of quadrant 500. The network of mesh interconnects 510 may also extend to the other quadrants of the processing unit (e.g., Quadrant 1 404 and Quadrant 2 406 of processing unit 400). Each cross-point element may include a P0 device and a P1 device configured for operation on the processing unit. That is, for example, each cross-point element (sometimes referred to as an XP) can have six ports: four mesh interconnect ports (north, east, south, and west) connected to mesh interconnects 510 and two device ports (P0 and P1). In some cases, each cross-point element can connect to up to four neighboring each cross-point elements through mesh interconnect ports connected to the mesh interconnects 510. Each of the two device ports (P0 and P1) of a cross-point element may include plural devices as noted (e.g., 2×, 4×, etc.) and may connect to other devices via mesh interconnect ports connected to the mesh interconnects 510.

As illustrated in the example of FIG. 5, the P0 device and/or the P1 device of a cross-point element may include four cores 502. In some cases, each of the four cores 502 may be configured as an RN-F (fully coherent requesting node). The P0 device and/or the P1 device of a cross-point element may include two system-level cache portions 514. In some cases, each of the two system-level cache portions 514 may be configured as an HN-F (fully coherent home node). The P0 device and/or the P1 device of a cross-point element may include a memory controller 520. In some cases, the memory controller 520 may be configured as an SN-F (fully coherent slave node).

Additionally, the P0 device and/or the P1 device of a cross-point element may include an RN-I bridge 526. The P0 device and/or the P1 device of a cross-point element may include two RN-D (I/O coherent requesting node with DVM support) bridges 528. The P0 device and/or the P1 device of a cross-point element may include an HN-P (I/O home node with PCIe optimizations) node 530. The P0 device and/or the P1 device of a cross-point element may include a CXG (cache coherent interconnect (CCIX) gateway) bridge 532. Each row in quadrant 500 may also include a row selector 534 for selecting a cross-point element on a particular row. For example, a first row selector 534-*a* may be used for selecting a cross-point element on Row 0; a second row selector 534-*b* may be used for selecting a cross-point element on Row 1: a third row selector 534-*c* may be used for selecting a cross-point element on Row 2; and a fourth row selector 534-*d* may be used for selecting a cross-point element on Row 3.

With reference to FIGS. 2, 4, and 5, the first core 202-*a* may be a core 502 in quadrant 500, which may be configured as Quadrant 0 402 of processing unit 400. The first core 202-*a* may attach or tag a first memory access request on the interconnect 210 with a first partition identifier (e.g., an MPAM PARTID). The first memory access request may be interleaved for completion by the first memory channel controller 220-*a*. The interconnect 210 may correspond to the mesh interconnects 510 that operatively couples core 502 to the memory controller 520 in quadrant 500.

In some examples, the second core 202-*b* may also be a core 502 in quadrant 500. The second core 202-*a* may attach or tag a second memory access request on the interconnect 210 with the first partition identifier or a second partition identifier (e.g., an MPAM PARTID). The second memory access request may be interleaved for completion by the first memory channel controller 220-*a* or the second memory channel controller 220-*b*, for example. Again, the interconnect 210 with respect to the second memory access request may correspond to the mesh interconnects 510 that operatively couples core 502 to the memory controller 520 in quadrant 500.

In some examples, at least one of the other memory channel controllers 220-*a* to 220-*n* is configured on a quadrant of processing unit 400 different from Quadrant 0 402. For example, the third memory channel controller 220-*c* may be configured on Quadrant 1 404. The processing unit 400 may determine the first bandwidth associated with the first memory channel controller 220-*a* and apply the first bandwidth to the third memory channel controller 220-*c* configured on Quadrant 1 404. That is, for example, because the processing unit 400 uses similar interleaving technique for the cores in each quadrant, the processing unit 400 can apply the bandwidth measured from a memory channel controller configured in one quadrant (e.g., Quadrant 0 402) to another memory channel controller configured in another quadrant (e.g., Quadrant 1 404). In this manner, bandwidth monitoring associated with the various memory channel controllers may be relaxed and/or other monitoring functions associated with the various memory channel controller may be performed, thereby optimizing the workload performance of the processing unit 400 as a whole.

Figure 6:
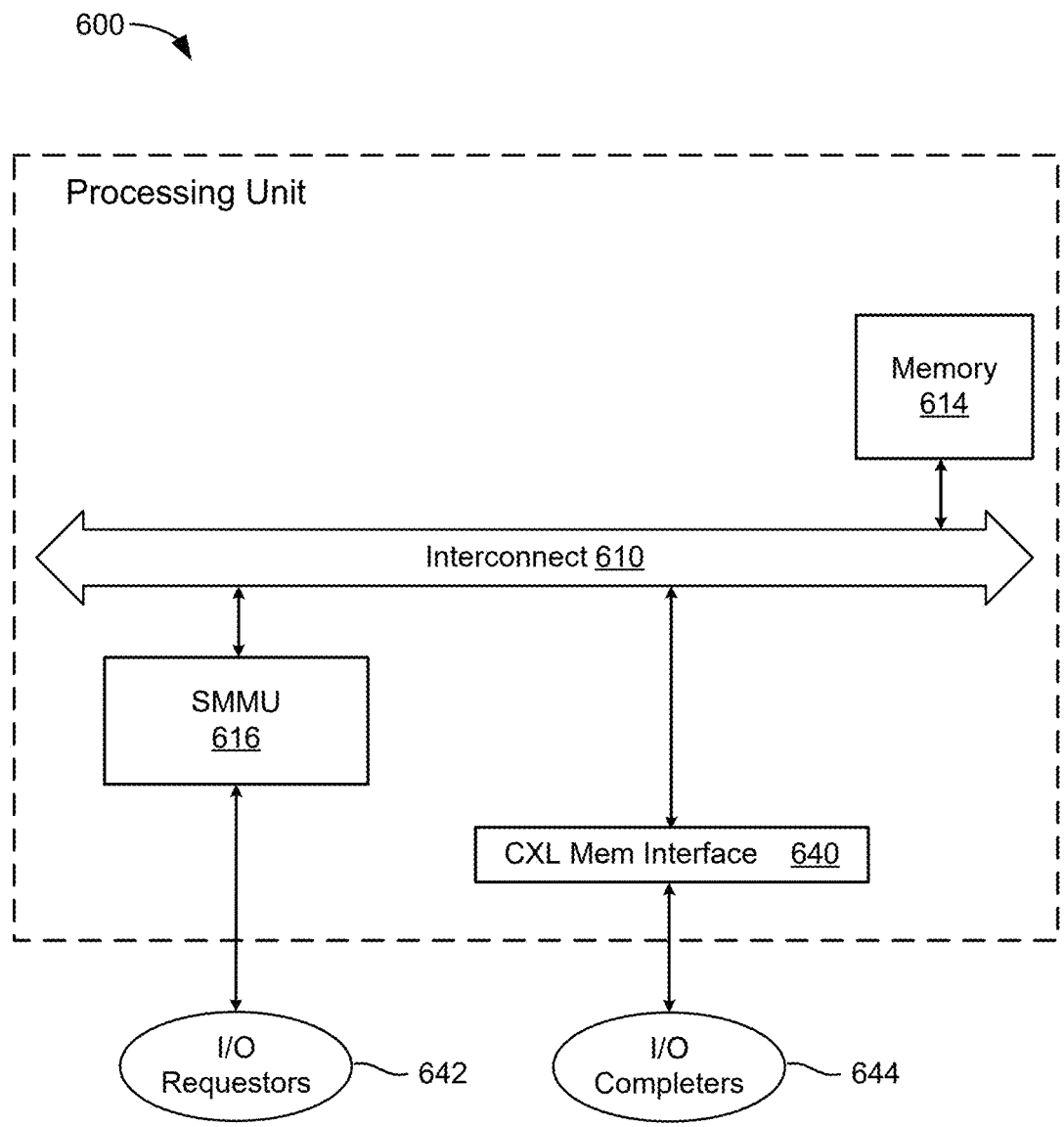
FIG. 6 illustrates a third example of a processing unit, according to aspects of the disclosure.

FIG. 6 illustrates a third example of a processing unit 600, according to aspects of the disclosure. In some examples, the techniques for memory resource control using MPAM described herein may be implemented using processing unit 600. Various aspects associated with processing unit 100, processing unit 200, and processing unit 400 may be included in processing unit 600. Similar to processing unit 100, processing unit 200, and processing unit 400, processing unit 600 may be configured as a CPU, a GPU, a TPU, or other processing units.

Processing unit 600 may include an SMMU 616 operatively coupled to interconnect 610. The SMMU 616 may also be operatively coupled to one or more I/O requestors 642. The processing unit 600 may include memory 614, which may be coupled to interconnect 610. As illustrated in the example of FIG. 6, the processing unit 600 may include memory controllers and memory devices, such as a compute express link (CXL) memory interface 640 that is operatively coupled to one or more I/O completers 644. In some cases, the CXL memory interface 640 may include a set of controllers to manage the corresponding one or more I/O completers 644.

In some examples, the SMMU 616 may attach or tag a first memory access request on the interconnect 610 with a first partition identifier (e.g., an MPAM PARTID). The SMMU 616 may also attach or tag a second memory access request on the interconnect 610 with the first partition identifier or a second partition identifier (e.g., an MPAM PARTID). In some examples, the processing unit 600 may interleave each memory access request from the SMMU 616 (e.g., forwarded from the one or more I/O requestors 642) to the CXL memory interface 640. Various interleaving techniques may be used in accordance with various implementations as described herein. For example, the interleaving of each memory access request from the SMMU 616 to the controllers of the CXL memory interface 640 may be performed in accordance with the interleaving patterns illustrated with respect to the example of FIG. 7.

FIG. 7 illustrates an interleaving example 700 of interleaving memory access requests to a CXL memory interface, according to aspects of the disclosure. The interleaving example 700 and interleaving techniques and patterns thereof may be applied to processing unit 100, processing unit 200, processing unit 400, processing unit 600, or any processing units described herein. The interleaving example 700 depicts an interleaving technique in which each memory access request is interleaved sequentially to the controllers of the CXL memory interface that are that are operatively coupled to the one or more I/O completers.

The MPAM completer rows 705 of interleaving example 700 list four I/O completers (e.g., managed via corresponding controllers of the CXL memory interface) designated as controller 00 to controller 03 (e.g., controllers of CXL memory interface 640). The MPAM requestor rows 710 of interleaving example 700 identify a memory access request from one of eight I/O requestors (e.g., I/O requestors 642), a sequential identifier corresponding to the memory access request, and an MPAM PARTID for the memory access request.

As illustrated in the interleaving example 700 of FIG. 7, each memory access request is sequentially provided to a next controller for completion of the request irrespective of the I/O requestor from which the request came or the MPAM PARTID for the memory access request. For example, after the last controller of the CXL memory interface (e.g., controller 03) in the set of controllers of the CXL memory interface is provided with a memory access request (e.g., memory request identifier 3 from I/O requestor device 5 with an MPAM PARTID4), the first controller of the CXL memory interface (e.g., controller 00) in the set of controllers of the CXL memory interface is provided with the next memory access request (e.g., memory request identifier 4 from I/O requestor device 1 with an MPAM PARTID0).

In some examples, an interleaving technique in which each memory access request that corresponds to a particular MPAM PARTID is interleaved sequentially to the controllers of the CXL memory interface may be used in accordance with some implementations. In the interleaving example 700, the utilization of the controllers of the CXL memory interface and corresponding memory devices (e.g., I/O completers 644) may be sufficiently uniform based on the memory access patterns applied by the interleaving techniques. Moreover, it is to be understood that other interleaving, striping, and/or memory access patterns to generate sufficiently uniform access across a set of memory system components are contemplated as would be apparent given the benefit of the disclosure.

Figure 8:
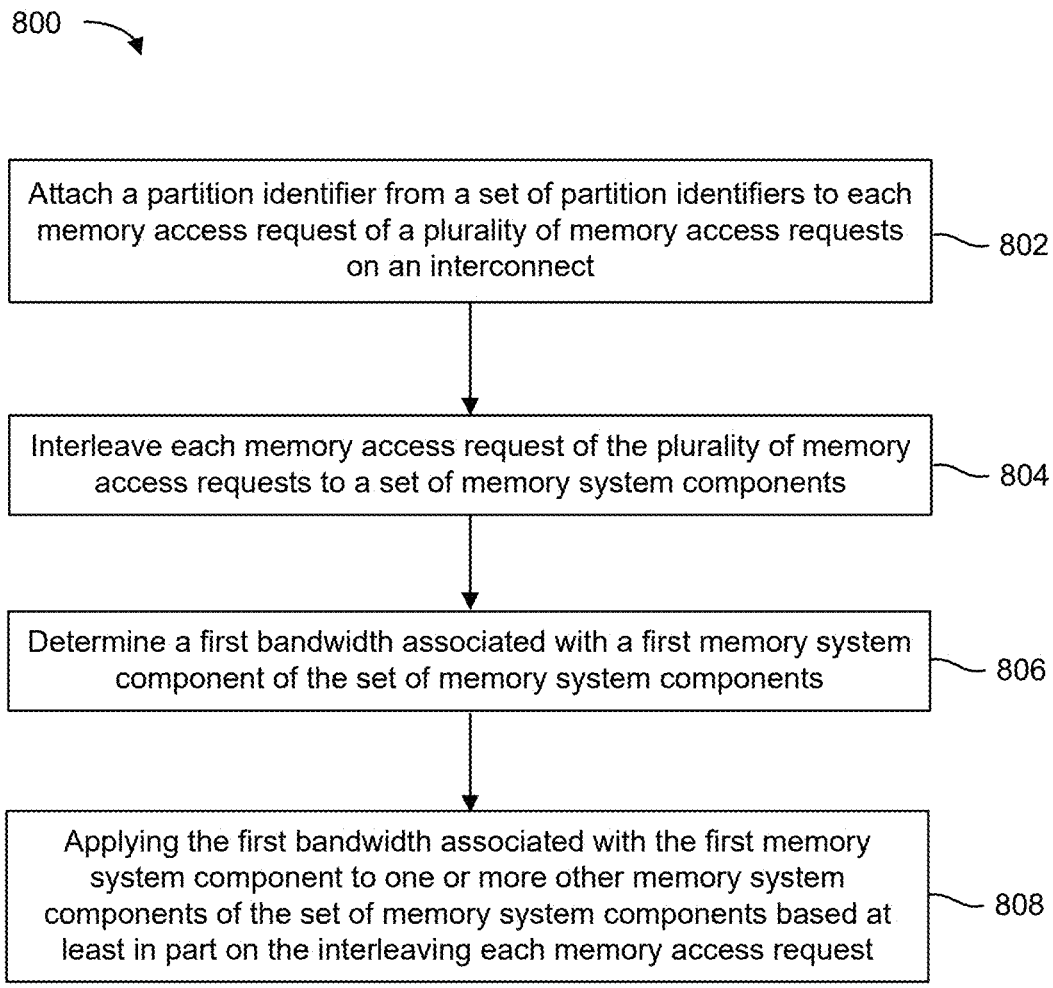
FIG. 8 is a flowchart of an example process for memory-system resource usage monitoring on a processing unit, according to aspects of the disclosure.

FIG. 8 is a flowchart of an example process 800 associated with techniques for memory resource control using MPAM extension features and the like, according to aspects of the disclosure. In some implementations, one or more process blocks of FIG. 8 may be performed by a processing unit (e.g., processing unit 100, processing unit 200, processing unit 400, and/or processing unit 600). In some implementations, one or more process blocks of FIG. 8 may be performed by various components of the processing unit. For example, one or more process blocks of FIG. 8 may be performed by one or more components of a processing unit, such as core processors, cache-memory controllers, memory channel controllers, CXL memory interface controllers, and/or interconnects.

As shown in FIG. 8, process 800 may include, at block 802, attaching a partition identifier from a set of partition identifiers to each memory access request of a plurality of memory access requests on an interconnect.

As further shown in FIG. 8, process 800 may include, at block 804, interleaving each memory access request of the plurality of memory access requests to a set of memory system components.

As further shown in FIG. 8, process 800 may include, at block 806, determining a first bandwidth associated with a first memory system component of the set of memory system components.

As further shown in FIG. 8, process 800 may include, at block 808, applying the first bandwidth associated with the first memory system component to one or more other memory system components of the set of memory system components based at least in part on the interleaving each memory access request.

Process 800 may include additional implementations, such as any single implementation or any combination of implementations described below and/or in connection with one or more other processes described elsewhere herein.

In some aspects, the attaching the partition identifier from the set of partition identifiers to each memory access request of the plurality of memory access requests on the interconnect comprises attaching a first partition identifier from the set of partition identifiers to a first memory access request from a first processing core on the interconnect, and attaching the first partition identifier or a second partition identifier from the set of partition identifiers to a second memory access request from a second processing core on the interconnect.

In some aspects, process 800 includes the first core, the second core, and the first memory system component are configured within a first sub-non-uniform memory access (sub-NUMA) domain of a set of sub-NUMA domains on the processing unit, and at least one memory system component of the one or more other memory system components is configured within a sub-NUMA domain of the set of sub-NUMA domains different from the first sub-NUMA domain.

In some aspects, the attaching the partition identifier from the set of partition identifiers to each memory access request of the plurality of memory access requests on the interconnect comprises attaching a first partition identifier from the set of partition identifiers to a first memory access request from a first input/output (I/O) requestor associated with a system memory management unit (SMMU) on the interconnect, and attaching the first partition identifier or a second partition identifier from the set of partition identifiers to a second memory access request from a second I/O requestor associated with the SMMU on the interconnect.

In some aspects, each partition identifier of the set of partition identifiers corresponds to a portion of a cache memory allocated for a corresponding memory request.

In some aspects, the cache memory is a system-level cache memory.

In some aspects, each partition identifier of the set of partition identifiers corresponds to an interconnect bandwidth allocated for a corresponding memory request.

In some aspects, each partition identifier of the set of partition identifiers corresponds to a memory bandwidth allocated for a corresponding memory request.

In some aspects, process 800 includes monitoring for changes in the first bandwidth associated with the first memory system component, and adjusting a total memory bandwidth for the set of memory system components based at least in part on the monitoring for changes in the first bandwidth.

In some aspects, process 800 includes accessing a plurality of memory devices associated with the set of partition identifiers and the set of memory system components.

In some aspects, at least one memory device of the plurality of memory devices corresponds to a double data rate (DDR) synchronous dynamic random-access memory (SDRAM).

In some aspects, at least one memory device of the plurality of memory devices corresponds to a memory device associated with a compute express link (CXL) interface.

In some aspects, the interleaving each memory access request of the plurality of memory access requests to the set of memory system components comprises interleaving each memory access request of the plurality of memory access requests sequentially to each memory system component of the set of memory system components.

In some aspects, the interleaving each memory access request of the plurality of memory access requests to the set of memory system components comprises interleaving each memory access request of the plurality of memory access requests corresponding to a particular partition identifier of the set of partition identifiers sequentially to each memory system component of the set of memory system components.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Advantages of process 800 include, in some examples, enabling the processing unit to implement fewer resources, for example, to support bandwidth monitoring of memory system components.

In one or more example aspects, the functions described may be implemented in hardware, software, firmware, or any combination thereof.

Those of skill in the art will appreciate that information and signals may be represented using any of a variety of different technologies and techniques. Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects described herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium, including but not limited to, computer readable medium or non-transitory storage media known in the art. An example storage medium may be coupled to the processor such that the processor can read information from, and write information to, the storage medium. In the alternative, the storage medium may be integral to the processor. The processor and the storage medium may reside in an ASIC.

Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have," "having," "comprises," "comprising," "includes," "including," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. A method of memory-system resource usage monitoring on a processing unit, comprising:
   attaching a partition identifier from a set of partition identifiers to each memory access request of a plurality of memory access requests on an interconnect;
   interleaving each memory access request of the plurality of memory access requests to a set of memory system components;
   determining a first bandwidth associated with a first memory system component of the set of memory system components; and
   applying the first bandwidth associated with the first memory system component as a bandwidth for each of one or more other memory system components of the set of memory system components based at least in part on the interleaving each memory access request.

2. The method of claim 1, wherein the attaching the partition identifier from the set of partition identifiers to each memory access request of the plurality of memory access requests on the interconnect comprises:
   attaching a first partition identifier from the set of partition identifiers to a first memory access request from a first processing core on the interconnect; and
   attaching the first partition identifier or a second partition identifier from the set of partition identifiers to a second memory access request from a second processing core on the interconnect.

3. The method of claim 2, wherein:
   the first processing core, the second processing core, and the first memory system component are configured within a first sub-non-uniform memory access (sub-NUMA) domain of a set of sub-NUMA domains on the processing unit, and
   at least one memory system component of the one or more other memory system components is configured within a sub-NUMA domain of the set of sub-NUMA domains different from the first sub-NUMA domain.

4. The method of claim 1, wherein the attaching the partition identifier from the set of partition identifiers to each memory access request of the plurality of memory access requests on the interconnect comprises:
   attaching a first partition identifier from the set of partition identifiers to a first memory access request from a first input/output (I/O) requestor associated with a system memory management unit (SMMU) on the interconnect; and
   attaching the first partition identifier or a second partition identifier from the set of partition identifiers to a second memory access request from a second I/O requestor associated with the SMMU on the interconnect.

5. The method of claim 1, wherein each partition identifier of the set of partition identifiers corresponds to a portion of a cache memory allocated for a corresponding memory request.

6. The method of claim 5, wherein the cache memory is a system-level cache memory.

7. The method of claim 1, wherein each partition identifier of the set of partition identifiers corresponds to an interconnect bandwidth allocated for a corresponding memory request.

8. The method of claim 1, wherein each partition identifier of the set of partition identifiers corresponds to a memory bandwidth allocated for a corresponding memory request.

9. The method of claim 8, further comprising:
monitoring for changes in the first bandwidth associated with the first memory system component; and
adjusting a total memory bandwidth for the set of memory system components based at least in part on the monitoring for changes in the first bandwidth.

10. The method of claim 1, further comprising:
accessing a plurality of memory devices associated with the set of partition identifiers and the set of memory system components.

11. The method of claim 10, wherein at least one memory device of the plurality of memory devices corresponds to a double data rate (DDR) synchronous dynamic random-access memory (SDRAM).

12. The method of claim 10, wherein at least one memory device of the plurality of memory devices corresponds to a memory device associated with a compute express link (CXL) interface.

13. The method of claim 1, wherein the interleaving each memory access request of the plurality of memory access requests to the set of memory system components comprises interleaving sequentially each memory access request of the plurality of memory access requests to each memory system component of the set of memory system components.

14. The method of claim 1, wherein the interleaving each memory access request of the plurality of memory access requests to the set of memory system components comprises interleaving sequentially each memory access request of the plurality of memory access requests corresponding to a particular partition identifier of the set of partition identifiers to each memory system component of the set of memory system components.

15. A processing unit, comprising:
an interconnect; and
one or more processors communicatively coupled to the interconnect and to communicate with one or more memories, the one or more processors, either alone or in combination, configured to:
attach a partition identifier from a set of partition identifiers to each memory access request of a plurality of memory access requests on an interconnect;
interleave each memory access request of the plurality of memory access requests to a set of memory system components;
determine a first bandwidth associated with a first memory system component of the set of memory system components; and
apply the first bandwidth associated with the first memory system component as a bandwidth for each of one or more other memory system components of the set of memory system components based at least in part on an interleaving of each memory access request.

16. The processing unit of claim 15, wherein the one or more processors, either alone or in combination, are configured to:
attach a first partition identifier from the set of partition identifiers to a first memory access request from a first processing core on the interconnect; and
attach the first partition identifier or a second partition identifier from the set of partition identifiers to a second memory access request from a second processing core on the interconnect.

17. The processing unit of claim 16, wherein:
the first core, the second core, and the first memory system component are configured within a first sub-non-uniform memory access (sub-NUMA) domain of a set of sub-NUMA domains on the processing unit, and
at least one memory system component of the one or more other memory system components is configured within a sub-NUMA domain of the set of sub-NUMA domains different from the first sub-NUMA domain.

18. The processing unit of claim 15, wherein the one or more processors, either alone or in combination, are configured to:
attach a first partition identifier from the set of partition identifiers to a first memory access request from a first input/output (I/O) requestor associated with a system memory management unit (SMMU) on the interconnect; and
attach the first partition identifier or a second partition identifier from the set of partition identifiers to a second memory access request from a second I/O requestor associated with the SMMU on the interconnect.

19. A non-transitory computer-readable medium storing computer-executable instructions that, when executed by a processing unit, cause the processing unit to:
attach a partition identifier from a set of partition identifiers to each memory access request of a plurality of memory access requests on an interconnect;
interleave each memory access request of the plurality of memory access requests to a set of memory system components;
determine a first bandwidth associated with a first memory system component of the set of memory system components; and
apply the first bandwidth associated with the first memory system component as a bandwidth for each of one or more other memory system components of the set of memory system components based at least in part on an interleaving of each memory access request.

20. A processing unit, comprising:
means for attaching a partition identifier from a set of partition identifiers to each memory access request of a plurality of memory access requests on an interconnect;
means for interleaving each memory access request of the plurality of memory access requests to a set of memory system components;
means for determining a first bandwidth associated with a first memory system component of the set of memory system components; and
means for applying the first bandwidth associated with the first memory system component as a bandwidth for each of one or more other memory system components of the set of memory system components based at least in part on the interleaving each memory access request.

* * * * *